(12) United States Patent
Chen et al.

(10) Patent No.: US 7,855,029 B2
(45) Date of Patent: Dec. 21, 2010

(54) FUEL CELL MODULE

(75) Inventors: Jiun-Ming Chen, Taipei County (TW);
Yu-Chih Lin, Kao-Hsiung (TW);
Chih-Yen Lin, Taipei County (TW);
Chiang-Wen Lai, Tao-Yuan (TW);
Ching-Sen Yang, Taoyuan County (TW)

(73) Assignee: Nan Ya Printed Circuit Board Corporation, Luchu, Taoyuan (TW)

( * ) Notice: Subject to any disclaimer, the term of this patent is extended or adjusted under 35 U.S.C. 154(b) by 769 days.

(21) Appl. No.: 11/854,537

(22) Filed: Sep. 12, 2007

(65) Prior Publication Data

US 2008/0233464 A1 Sep. 25, 2008

(30) Foreign Application Priority Data

Mar. 20, 2007 (TW) ............................... 96109616 A
Aug. 20, 2007 (TW) ............................... 96130717 A

(51) Int. Cl.
*H01M 2/38* (2006.01)
(52) U.S. Cl. ....................... 429/457; 429/405; 429/456; 429/460; 429/463; 429/468; 429/469; 429/508; 429/510; 429/514; 429/518; 429/519

(58) Field of Classification Search ................. 429/405, 429/456, 457, 458, 460, 463, 468, 467, 470, 429/471, 481, 483, 508, 510, 514, 519
See application file for complete search history.

(56) References Cited

U.S. PATENT DOCUMENTS

| 7,585,582 | B2 * | 9/2009 | Chen et al. ................... 429/415 |
| 7,695,840 | B2 * | 4/2010 | Bartling ....................... 429/483 |
| 2006/0141326 | A1 * | 6/2006 | Artibise et al. ................. 429/38 |

* cited by examiner

*Primary Examiner*—Patrick Ryan
*Assistant Examiner*—Ben Lewis
(74) *Attorney, Agent, or Firm*—Winston Hsu; Scott Margo

(57) ABSTRACT

A fuel cell module includes an anode flow board, a cathode board, an intermediate adhesive layer, a membrane electrode assembly (MEA) including a membrane edge, and a leak-proof adhesive layer mounted on the membrane edge, thereby preventing contact between the intermediate adhesive layer and the membrane edge. The adhesive ability of the leak-proof adhesive layer to the membrane edge is higher than that of the intermediate adhesive layer to the membrane edge. Therefore, the methanol leakage from the membrane can be avoided.

19 Claims, 5 Drawing Sheets

FUEL CELL MODULE

BACKGROUND OF THE INVENTION

1. Field of the Invention

The present invention relates to a fuel cell and, more particularly, to a flat-panel direct methanol fuel cell module capable of solving the fuel leakage problem.

2. Description of the Prior Art

A fuel cell is an electrochemical cell in which a free energy change resulting from a fuel oxidation reaction is converted into electrical energy. Fuel cells utilizing methanol as fuel are typically named as Direct Methanol Fuel cells (DMFCs), which generate electricity by combining gaseous or aqueous methanol with air. DMFC technology has become widely accepted as a viable fuel cell technology that offers itself to many application fields such as electronic apparatuses, vehicles, military equipments, aerospace industry and so on.

DMFCs, like ordinary batteries, provide dc electricity from two electrochemical reactions. These reactions occur at electrodes (or poles) to which reactants are continuously fed. The negative electrode (anode) is maintained by supplying methanol, whereas the positive electrode (cathode) is maintained by the supply of air. When providing current, methanol is electrochemically oxidized at the anode electrocatalyst to produce electrons, which travel through the external circuit to the cathode electrocatalyst where they are consumed together with oxygen in a reduction reaction. The circuit is maintained within the cell by the conduction of protons in the electrolyte. One molecule of methanol ($CH_3OH$) and one molecule of water ($H_2O$) together store six atoms of hydrogen. When fed as a mixture into a DMFC, they react to generate one molecule of $CO_2$, 6 protons ($H^+$), and 6 electrons to generate a flow of electric current. The protons and electrons generated by methanol and water react with oxygen to generate water. The methanol-water mixture provides an easy means of storing and transporting hydrogen, much better than storing liquid or gaseous hydrogen in storage tanks.

The DMFC module usually includes a current collector (or also referred to as charge collector board) and a flow board, which both play important roles. The current collector collects the electrons generated from the electron-chemical reaction, and the flow board manages and controls the distribution of the fuel. In the past, the flow board design has focused on enabling fuel to pass smoothly through the fuel channel into the membrane electrode assembly (MEA).

Hitherto, the flat-panel direct methanol fuel cell has been developed into a mature phase and has relatively higher performance and reliability. However, the prior art flat-panel direct methanol fuel cell still has several drawbacks such as fuel leakage. There is a need to provide an improved flat-panel direct methanol fuel cell module capable of solving the aforesaid prior art problems.

SUMMARY OF THE INVENTION

In view of the above reasons, the main purpose of the present invention is providing an improved fuel cell module in order to promote the safety of the fuel cell module.

According to the claimed invention, a fuel cell module includes an anode flow board, a cathode board, an intermediate adhesive layer such as prepreg or epoxy resins, a membrane electrode assembly (MEA) including a membrane edge, and a leak-proof adhesive layer such as PU or silicone adhesives mounted on the membrane edge, thereby preventing contact between the intermediate adhesive layer and the membrane edge. The adhesive ability of the leak-proof adhesive layer to the membrane edge is higher than that of the intermediate adhesive layer to the membrane edge. Therefore, the methanol leakage from the membrane can be avoided.

From another aspect, a fuel cell module includes an anode flow board comprising at least one anode board, an adhesive layer, and a flow board that provides flow path for fuel and reaction products, wherein the anode board comprises an anode supporting substrate having a printed circuitry formed thereon by printed circuit board processes and at least one anode charge collector fixed on the anode supporting substrate and the anode charge collector is electrically connected to the printed circuitry, wherein the adhesive layer bonds the anode board and the flow board; a cathode board comprising a substrate, at least one cathode charge collector and a plurality of through holes on the cathode charge collector, wherein the cathode charge collector is formed on two opposite sides of the substrate; a membrane electrode assembly (MEA) comprising at least one proton exchange membrane; an intermediate adhesive layer having a corresponding opening for accommodating the MEA; and a leak-proof adhesive layer mounted between the anode flow board and the MEA for preventing direct contact between the intermediate adhesive layer and the proton exchange membrane, wherein adhesion ability of the leak-proof adhesive layer to the proton exchange membrane is better than that of the intermediate adhesive layer to the proton exchange membrane.

The intermediate adhesive layer, the MEA, and the leak-proof adhesive layer are laminated together between the anode flow board and the cathode board, and wherein the MEA has two opposite sides that are in contact with the anode flow board and the cathode charge collector, respectively.

These and other objectives of the present invention will no doubt become obvious to those of ordinary skill in the art after reading the following detailed description of the preferred embodiment that is illustrated in the various figures and drawings.

DETAILED DESCRIPTION

As previously mentioned, the flat-panel direct methanol fuel cell has been developed into a mature phase and has relatively higher performance and reliability. However, the prior art flat-panel direct methanol fuel cell still has several drawbacks such as fuel leakage. It is believed that the leakage path is the seam between the prepreg intermediate adhesive layer and the MEA (membrane electrode assembly). The fuel leakage usually occurs at the MEA side. The seam is caused by delamination resulting from poor adhesion between the prepreg intermediate adhesive layer and the MEA.

In practical applications, it has been found that the fuel leakage may occur near the anode charge collector (ACC) side. The possible leakage path in this case may be the interface between the charge collecting sheet and the adjacent adhesive material. The causes of the formation of such leakage path near the ACC side may include the stress originated from the bending of interconnection lugs and difference of the CTEs (coefficients of thermal expansion) between metal and adhesive material. The aforesaid interface may be damaged when performing the thermal shock experiments according to IEC standards.

Figure 1:
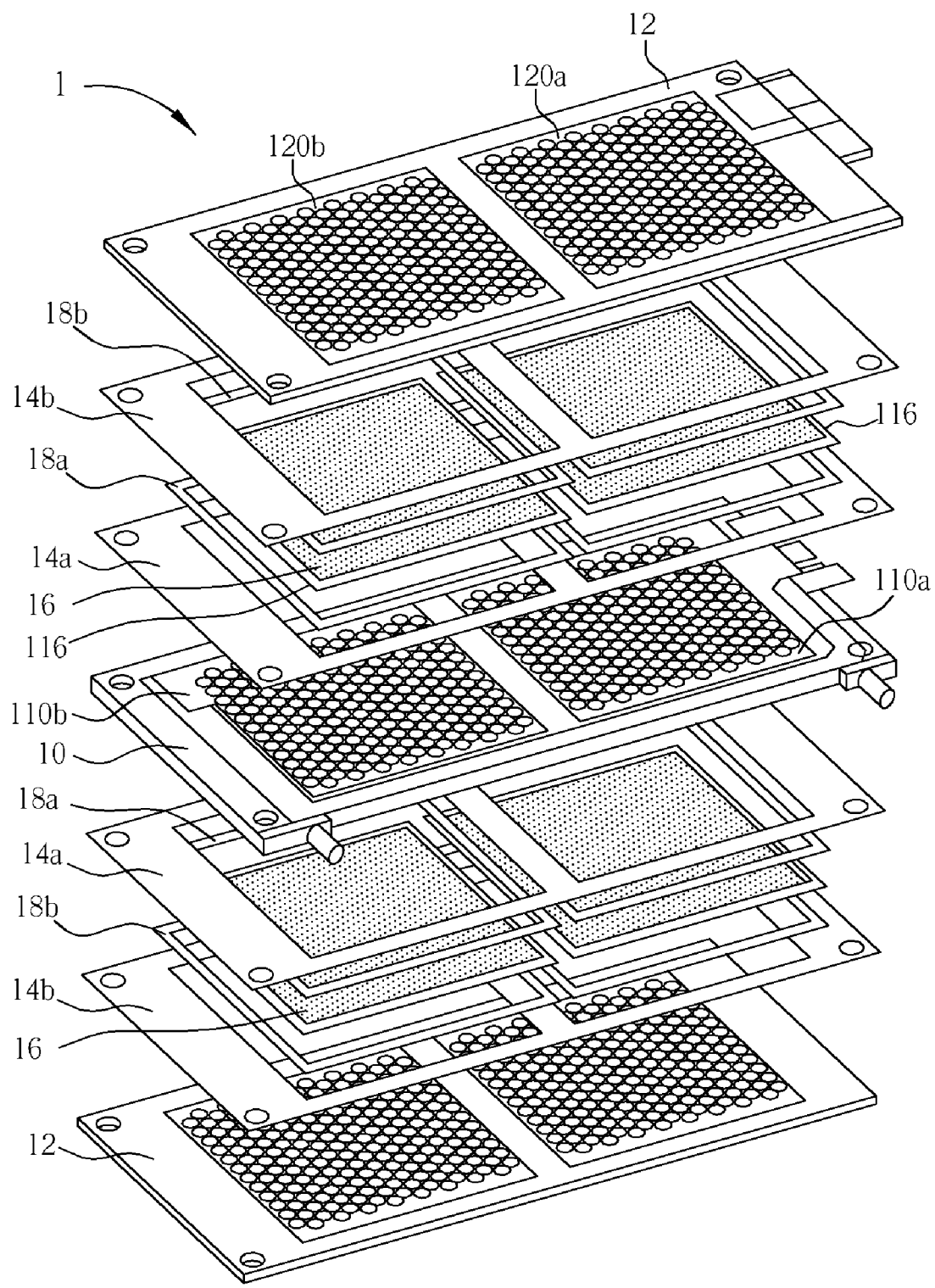
FIG. 1 is a schematic, exploded diagram illustrating the fuel cell module in accordance with one preferred embodiment of this invention.
Figure 2:
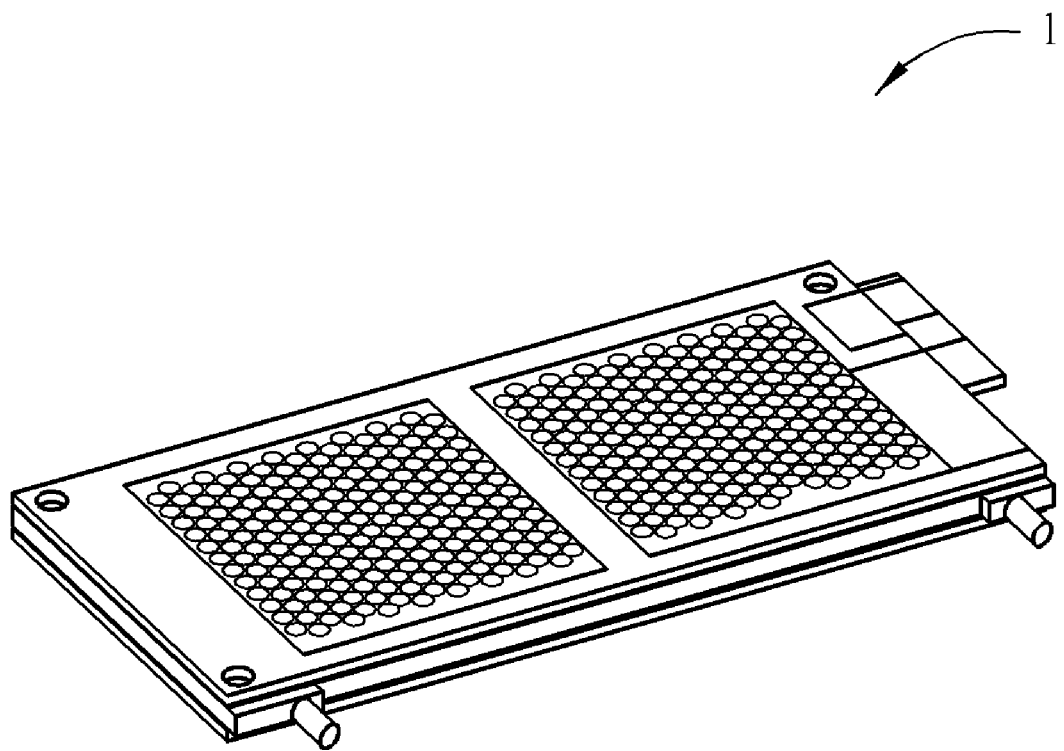
FIG. 2 is a schematic diagram illustrating a side view of the fuel cell module of FIG. 1 after assembly.

Please refer to FIG. 1 and FIG. 2. FIG. 1 is a schematic, exploded diagram illustrating the fuel cell module 1 (taking a 2W cell as an example) in accordance with one preferred embodiment of this invention. FIG. 2 is a schematic diagram illustrating a side view of the fuel cell module of FIG. 1 after assembly. As shown in FIG. 1 and FIG. 2, according to the preferred embodiment of this invention, the fuel cell module 1 comprises an anode flow board 10, a cathode board 12 (in contact with air), intermediate adhesive layers 14a and 14b, at least one MEA 16, and leak-proof adhesive layer 18a and 18b. The aforesaid elements are laminated together.

The aforesaid anode flow board 10 is a combination of at least one anode board and a flow board. The details of the structure of the anode flow board 10 will be described later. The cathode board 12 may be fabricated by PCB (printed circuit board) processes, or may be made of graphite or metals, but not limited thereto.

The intermediate adhesive layers 14a and 14b, the MEA 16 and the leak-proof adhesive layers 18a and 18b are laminated together between the anode flow board 10 and the cathode board 12. The intermediate adhesive layers 14a and 14b have respective openings for accommodating the MEA 16 such that the opposite sides of the MEA 16 is in directly contact with anode charge collectors 110a and 110b of the anode flow board 10 and cathode charge collectors 120a and 120b of the cathode board 12, respectively.

The anode charge collectors 110a and 110b are responsible for collecting electrons generated by oxidizing the methanol of the fuel. The collected electrons are transmitted through the charge collectors and printed circuitry fabricated on the anode supporting substrate 100 of the anode flow board 10. A plurality of through holes are provided on the charge collectors that function as diffusion channels for the reactants and products of the fuel cell.

The anode charge collectors 110a and 110b may be made of metals such as gold, platinum, silver, aluminum, chrome, titanium, cadmium or the like, metal oxides, metal alloys such as various stainless steels. Moreover, the anode charge collectors 110a and 110b may be made of non-metal materials such as carbon, graphite, FR4, FR5 or any suitable composite materials. The fabrication of the anode charge collectors 110a and 110b may include depositing a conductive layer onto a substrate by electroplating, electroless plating, sputtering, or any suitable chemical or physical deposition methods. Preferably, the entire surface of the aforesaid substrate is completely covered with the conductive layer.

The cathode board 12 may be fabricated by using conventional printed circuit boards, plastic boards, graphite boards or metal boards, preferably printed circuit boards. It is understood that the substrate of a printed circuit board is typically referred to a copper clad laminate substrate. The copper clad laminate substrate may include but not limited to glass fiber reinforced polymers.

According to the preferred embodiment, the cathode board 12 comprises a substrate, cathode charge collectors 120a and 120b, and a plurality of through holes. To fabricate the cathode board 12, a conventional lithographic process including exposure and development processes is performed to define cathode electrode areas on two opposite sides of the cathode board 12. A drilling process is then performed to drill the though holes within the aforesaid cathode electrode areas. Thereafter, electroplating, electroless plating, sputtering or any suitable chemical or physical deposition is carried out to cover the aforesaid cathode electrode areas and interior surfaces inside the through holes with at least one conductive layer (not shown), thereby forming the cathode charge collectors 120a and 120b. The aforesaid conductive layer comprises metals such as copper, gold, silver or platinum.

The intermediate adhesive layers 14a and 14b has good and stable adhesion ability to both of the anode flow board 10 and the cathode board 12. The intermediate adhesive layers 14a and 14b comprises polymeric adhesive materials. Preferred examples of the intermediate adhesive layers 14a and 14b include polymers, epoxy, prepreg adhesive, which melts at high temperatures to glue the anode flow board 10 and the cathode board 12.

According to the preferred embodiment, the MEA 16 comprises proton exchange membrane 116 such as Dupont's Nafion (carbon-fluoride system). It is understood that the proton exchange membrane 116 may be a hydrocarbon type proton exchange membrane. It is found that the proton exchange membrane 116 has poor adhesion to the aforesaid intermediate adhesive layers 14a and 14b. Accordingly, the methanol or fuel leaks out through the interface between the intermediate adhesive layers 14a or 14b and the MEA 16.

The first distinctive feature of the present invention is the disposition of the frame-shaped leak-proof adhesive layers 18a and 18b, which are disposed along the perimeter of the MEA 16 to frame the MEA 16. As shown in FIG. 1, the shape of the leak-proof adhesive layers 18a and 18b conforms to the shape of the MEA 16. The four sides of each of the leak-proof adhesive layers 18a and 18b have suitable width such that the leak-proof adhesive layers 18a and 18b are able to fittingly cover and stick onto the exposed edges of the proton exchange membrane 116 of the MEA 16. The leak-proof adhesive layer 18a adheres to an upper side of the exposed edges of the proton exchange membrane 116, while the leak-proof adhesive layer 18a adheres to a lower side of the exposed edges of the proton exchange membrane 116. It is critical that the exposed edges along four sides of the proton exchange membrane 116 of the MEA 16 do not directly contact with the intermediate adhesive layers 14a and 14b.

According to this invention, the leak-proof adhesive layers 18a and 18b have good and stable adhesion ability to the proton exchange membrane 116 of the MEA 16 and to the intermediate adhesive layers 14a and 14b. Preferable examples of the leak-proof adhesive layers 18a and 18b include, but not limiting to, polyurethane (PU) resins or silicone resins.

Since the leak-proof adhesive layers 18a and 18b avoid the direct contact between the exposed four edges of the proton exchange membrane 116 of the MEA 16 and the intermediate adhesive layers 14a and 14b, the poor adhesion between the aforesaid intermediate adhesive layers 14a and 14b and the proton exchange membrane 116 can be improved, thereby blocking the potential leakage path in the fuel cell.

It is noteworthy that in another preferred embodiment of this invention merely leak-proof adhesive layer 18a between the MEA 16 and the anode flow board 10 is disposed while the leak-proof adhesive layer 18b between the MEA 16 and the cathode board 12 is omitted. This saves cost and simplifies the fabrication process.

The second distinctive feature of the present invention fuel cell module 1 is that the anode flow board 10 has an improved design that is capable of avoiding fuel leakage.

Figure 3:
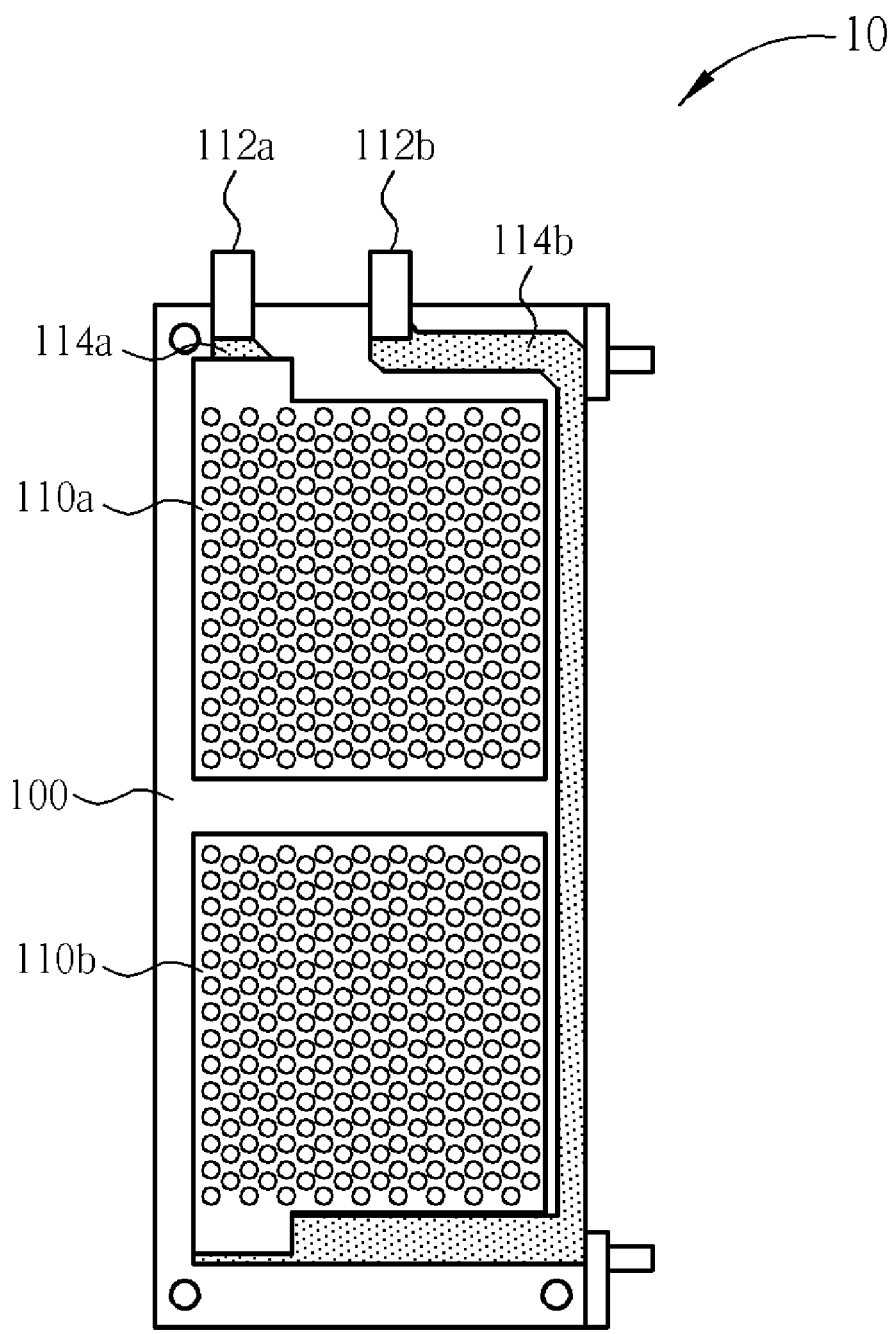
FIG. 3 is a schematic, planar view of the anode flow board 10 of FIG. 1.
Figure 4:
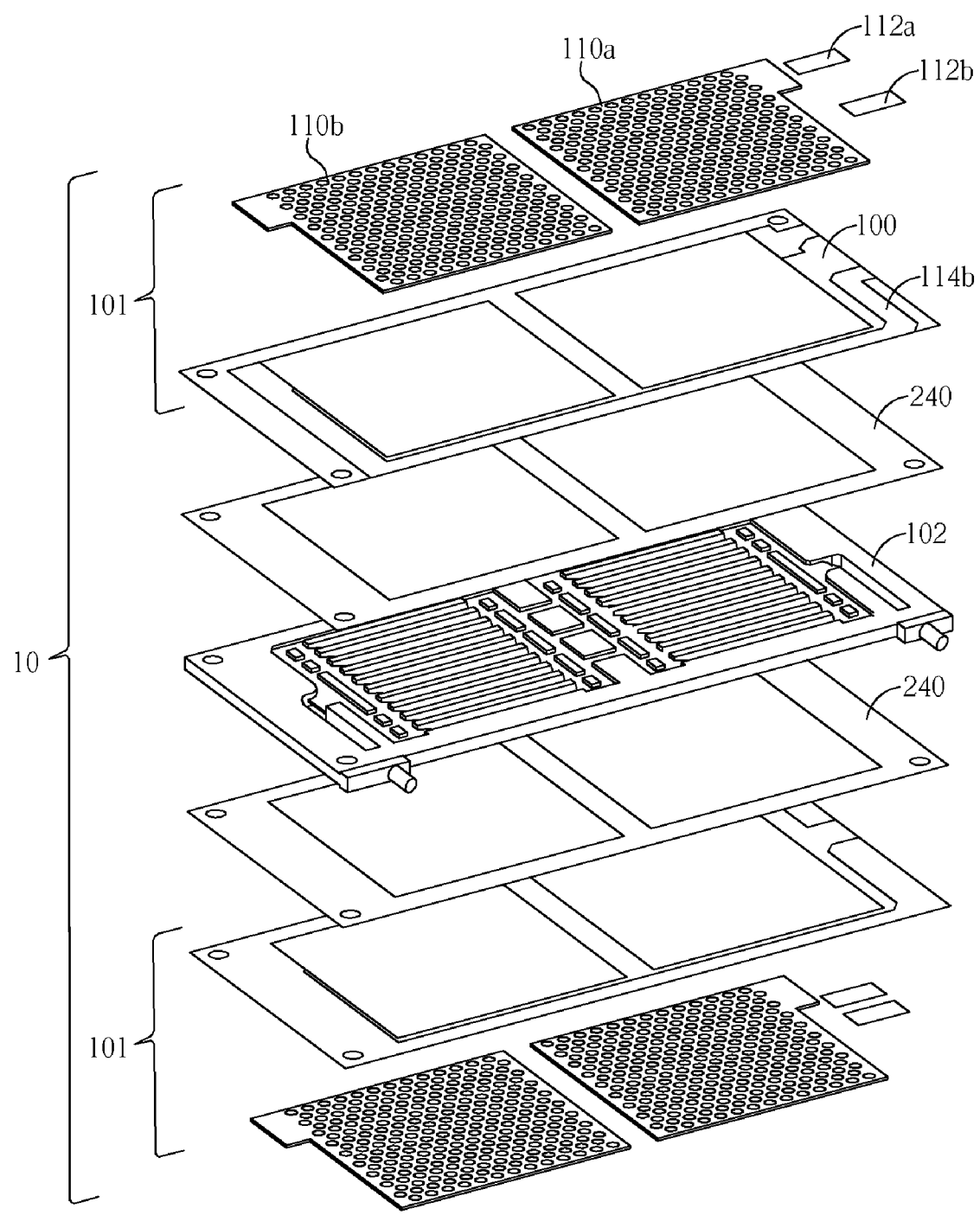
FIG. 4 is a schematic, exploded diagram of the anode flow board 10 of FIG. 1.

Please refer to FIG. 3 and FIG. 4. FIG. 3 is a schematic, planar view of the anode flow board 10 of FIG. 1. FIG. 4 is a schematic, exploded diagram of the anode flow board 10 of FIG. 1.

As shown in FIG. 3 and FIG. 4, the anode flow board 10 comprises an anode supporting substrate 100. Conductive circuitry 114a and conductive circuitry 114b are formed on the surface of the anode supporting substrate 100 by, for example, PCB compatible processes. The anode charge collectors 110a and 110b are mounted on respective openings of the anode supporting substrate 100 using pressing, welding or soldering methods. The anode charge collector 110a is electrically connected to one distal end of the conductive circuitry 114a. The anode charge collector 110b is electrically connected to one distal end of the conductive circuitry 114b.

The anode flow board 10 further comprises bendable metal lugs 112a and 112b. The metal lug 112a is electrically connected with the other end of the conductive circuitry 114a. The metal lug 112b is electrically connected with the other end of the conductive circuitry 114b. After assembly, by bending the metal lugs 112a and 112b the unit cells of the fuel cell module 1 can constitute series or parallel connection configurations.

It is noteworthy that the metal lugs 112a and 112b are preferably mounted on the anode flow board 10 by using spot welding or soldering methods. The anode charge collectors 110a and 110b are preferably mounted on the anode supporting substrate 100 by using spot welding or soldering methods.

As shown in FIG. 4, after welding and pressing, the anode supporting substrate 100, the metal lugs 112a and 112b, and anode charge collectors 110a and 110b are laminated together and constitute an anode board 101. The aforesaid anode board 101, the adhesive layer 240 and flow board 102 are pressed and laminated together to form the present invention anode flow board 10. The aforesaid adhesive layer 240 comprises prepreg or epoxy resins.

As previously mentioned, the metal lugs 112a and 112b are electrically connected to corresponding anode charge collectors 110a and 110b through conductive circuitry 114a and conductive circuitry 114b fabricated in advance using PCB process. It is critical that the metal lugs 112a and 112b do not directly contact with corresponding anode charge collectors 110a and 110b and a recess forms between the metal lug 112a or 112b and the corresponding anode charge collector 110a or 110b. The recess is filled with the intermediate adhesive layer 14a during the subsequent assembly stage and thus effectively blocking the fuel leakage by way of the metal lugs 112a and 112b.

The prior art drawbacks including the poor adhesion caused by stress originated from the bending of the metal lugs for series or parallel connection, and the interface damage caused by difference of CTEs between the metal and adhesive can be effectively improved. It has been experimentally proven that the present invention fuel cell module can solve the fuel leakage problem.

Figure 5:
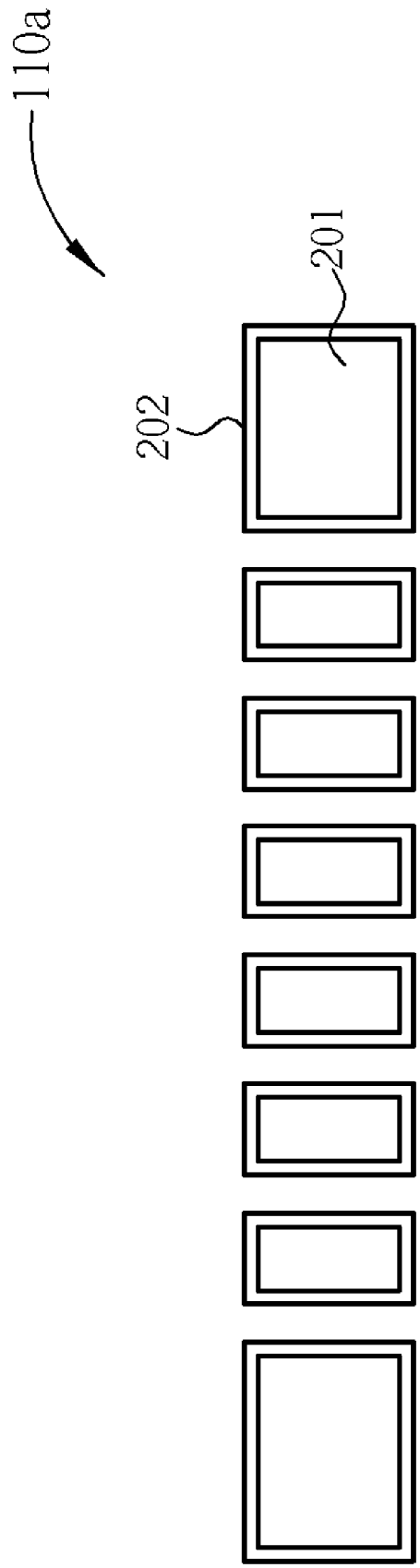
FIG. 5 is a schematic, cross-sectional diagram illustrating the charge collector according to this invention.

The third distinctive feature of the present invention is that the anode charge collectors 110a and 110b are stainless-steel based. As shown in FIG. 5, the anode charge collectors 110a includes a stainless-steel base 201 such as SS316L and methanol-corrosion resistive conductive lining layer 202 such as copper, gold, silver or platinum, preferably silver which is relatively cheaper. The conductive lining layer 202 completely covers any surface of the stainless-steel base 201 to isolate the stainless-steel base 201 from exposing the methanol or fuel solution. Further, the anode charge collectors may include a non-metal base.

Depositing silver on the surfaces of the anode charge collectors 110a and 110b can improve the conductivity and resistance to the methanol corrosion, thereby promoting the performance and durability of the fuel cell module 1. Furthermore, since the metal lugs 112a and 112b do not contact with the fuel solution or methanol, the choice of materials of the metal lugs 112a and 112b my include copper, but not limited thereto.

Those skilled in the art will readily observe that numerous modifications and alterations of the device and method may be made while retaining the teachings of the invention.

What is claimed is:

1. A fuel cell module comprising:
    an anode flow board comprising at least one anode board, an adhesive layer, and a flow board that provides flow path for fuel and reaction products, wherein said anode board comprises an anode supporting substrate having a printed circuitry formed thereon by printed circuit board processes and at least one anode charge collector fixed on said anode supporting substrate and said anode charge collector is electrically connected to said printed circuitry, wherein said adhesive layer bonds the anode board and the flow board;
    a cathode board comprising a substrate, at least one cathode charge collector and a plurality of through holes on said cathode charge collector, wherein said cathode charge collector is formed on two opposite sides of said substrate;
    a membrane electrode assembly (MEA) comprising at least one proton exchange membrane;
    an intermediate adhesive layer having a corresponding opening for accommodating said MEA; and
    a leak-proof adhesive layer mounted between said anode flow board and said MEA for preventing direct contact between the intermediate adhesive layer and said proton exchange membrane, wherein adhesion ability of said leak-proof adhesive layer to said proton exchange membrane is better than that of said intermediate adhesive layer to said proton exchange membrane;
    wherein said intermediate adhesive layer, said MEA, and said leak-proof adhesive layer are laminated together between said anode flow board and said cathode board, and wherein said MEA has two opposite sides that are in contact with said anode flow board and said cathode charge collector, respectively.

2. The fuel cell module according to claim 1 wherein said leak-proof adhesive layer comprises polyurethane or silicone resins.

3. The fuel cell module according to claim 1 wherein said intermediate adhesive layer comprises polymer adhesives.

4. The fuel cell module according to claim 3 wherein said polymer adhesives comprise prepreg adhesive and epoxy resins.

5. The fuel cell module according to claim 1 wherein said anode charge collector is made of metal materials or non-metal materials.

6. The fuel cell module according to claim 5 wherein said metal materials comprise gold, platinum, silver, aluminum, chrome, titanium, cadmium, metal oxides thereof, metal alloys thereof or stainless steels.

7. The fuel cell module according to claim 5 wherein said non-metal materials comprise carbon, graphite, FR4 or FR5.

8. The fuel cell module according to claim 1 wherein said cathode charge collector comprises at least one conductive layer.

9. The fuel cell module according to claim 8 wherein said conductive layer is formed by electroplating, electroless plating, sputtering or chemical or physical deposition methods.

10. The fuel cell module according to claim 9 wherein said conductive layer comprises copper, gold, silver or platinum.

11. The fuel cell module according to claim 1 wherein said anode charge collector is fixed on said anode supporting substrate by pressing, spot welding or soldering methods.

12. The fuel cell module according to claim 1 wherein said anode charge collector lining with at least one conductive layer that completely covers said anode charge collector.

13. The fuel cell module according to claim 12 wherein said conductive layer is formed by electroplating, electroless plating, sputtering or chemical or physical deposition methods.

14. The fuel cell module according to claim 12 wherein said conductive layer is resistive to methanol corrosion.

15. The fuel cell module according to claim 12 wherein said conductive layer comprises copper, gold, silver or platinum.

16. The fuel cell module according to claim 1 wherein said proton exchange membrane comprises carbon-fluoride system or hydrocarbon-type proton exchange membranes.

17. The fuel cell module according to claim 1 wherein said cathode board is fabricated by using printed circuit boards, plastic boards, graphite boards or metal boards.

18. The fuel cell module according to claim 1 wherein said anode flow board further comprises a bendable metal lug for electrically connecting said printed circuitry on said anode supporting substrate thereby forming series or parallel connection configurations of unit cells of said fuel cell module.

19. The fuel cell module according to claim 18 wherein said metal lug is fixed on said anode supporting substrate by spot welding or soldering methods.

* * * * *